US011268434B1

(12) United States Patent
Voice et al.

(10) Patent No.: US 11,268,434 B1
(45) Date of Patent: Mar. 8, 2022

(54) METHOD AND SYSTEM FOR EXTENDING DILUTION LIMIT OF A PRECHAMBER SPARK IGNITION ENGINE

(71) Applicant: ARAMCO SERVICES COMPANY, Houston, TX (US)

(72) Inventors: Alexander Voice, Detroit, MI (US); Nayan Engineer, Canton, MI (US); Xin Yu, New Hudson, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/998,539

(22) Filed: Aug. 20, 2020

(51) Int. Cl.
*F02B 19/12* (2006.01)
*F02P 13/00* (2006.01)
*F02B 19/10* (2006.01)
*F02B 19/18* (2006.01)

(52) U.S. Cl.
CPC ............ *F02B 19/12* (2013.01); *F02B 19/108* (2013.01); *F02B 19/1014* (2013.01); *F02B 19/18* (2013.01); *F02P 13/00* (2013.01)

(58) Field of Classification Search
CPC ........ F02B 19/018; F02B 19/12; F02B 19/18; F02B 19/1014; F02P 13/00
See application file for complete search history.

(56) References Cited

U.S. PATENT DOCUMENTS

| | | | |
|---|---|---|---|
| 4,023,539 | A | 5/1977 | Noguchi et al. |
| 4,074,661 | A | 2/1978 | Noguchi et al. |
| 5,611,307 | A | 3/1997 | Watson |
| 6,776,144 | B1 | 8/2004 | Newman |
| 8,050,848 | B2 | 11/2011 | Huschenbett et al. |
| 9,217,360 | B2 | 12/2015 | Pierz |

(Continued)

FOREIGN PATENT DOCUMENTS

| | | |
|---|---|---|
| JP | 2008038819 A | 2/2008 |
| WO | 2008106722 A1 | 9/2008 |

(Continued)

OTHER PUBLICATIONS

Attard, William P. and Hugh Blaxill, "A Lean Burn Gasoline Fueled Pre-Chamber Jet Ignition Combustion System Achieving High Efficiency and Low NOx at Part Load", SAE International, Apr. 2012 (14 pages).

(Continued)

*Primary Examiner* — George C Jin
(74) *Attorney, Agent, or Firm* — Osha Bergman Watanabe & Burton LLP (57) ABSTRACT

A system includes an engine having a main combustion chamber and a prechamber containing a spark plug. The prechamber is in fluid communication with the main combustion chamber through at least one orifice. An engine intake line provides intake air to the engine. An engine exhaust line receives exhaust gases from the engine. An exhaust gas recirculation line transports a portion of the exhaust gases from the engine exhaust line to the engine intake line, forming an exhaust gas recirculation loop through the engine. The system includes a reformer having a reactor containing a catalyst-coated substrate. The reformer generates a gaseous reformate from a fuel. The system includes a prechamber feed line to transport a stream of the gaseous reformate from the reformer to the prechamber.

17 Claims, 8 Drawing Sheets

(56) References Cited

U.S. PATENT DOCUMENTS

| | | | |
|---|---|---|---|
| 9,932,921 | B2 | 4/2018 | Hoard et al. |
| 10,202,959 | B2 | 2/2019 | Kim |
| 2006/0278195 | A1 | 12/2006 | Hotta et al. |
| 2007/0144459 | A1 | 6/2007 | Fiveland |
| 2007/0183939 | A1 | 8/2007 | Hotta et al. |
| 2010/0224141 | A1* | 9/2010 | Nakada .............. F02D 19/0671 123/3 |
| 2010/0319635 | A1 | 12/2010 | Morgenstern |
| 2012/0291424 | A1 | 11/2012 | Inuzuka et al. |
| 2013/0000275 | A1 | 1/2013 | Scotto |
| 2013/0055985 | A1* | 3/2013 | Gruber .................... F02B 19/12 123/253 |
| 2014/0224208 | A1 | 8/2014 | Gruber et al. |
| 2015/0075451 | A1* | 3/2015 | Inuzuka ................. F02B 43/12 123/3 |
| 2015/0166913 | A1 | 6/2015 | Brody et al. |
| 2015/0176480 | A1 | 6/2015 | Maceroni et al. |
| 2016/0230645 | A1* | 8/2016 | Schock .................. F02B 19/06 |
| 2016/0265416 | A1 | 9/2016 | Ge |
| 2017/0074184 | A1* | 3/2017 | Kim .................... F02D 41/0077 |
| 2017/0101967 | A1* | 4/2017 | Loetz ...................... F02B 19/16 |
| 2017/0306917 | A1* | 10/2017 | Kim .................... F02D 13/0269 |
| 2020/0200068 | A1* | 6/2020 | Schock .................. F02B 21/02 |
| 2021/0079835 | A1* | 3/2021 | Chiera .................... F02B 19/12 |

FOREIGN PATENT DOCUMENTS

| | | |
|---|---|---|
| WO | 2014053167 A1 | 4/2014 |
| WO | 2019027800 A2 | 2/2019 |

OTHER PUBLICATIONS

Attard, William P. and Hugh Blaxill, "A Gasoline Fueled Pre-Chamber Jet Ignition Combustion System at Unthrottled Conditions",SA International Jet Engines, SAE International, vol. 5, Issue 2, May 2012, pp. 315-329 (15 pages).

Attard, William P. and Hugh Blaxill, "A Single Fuel Pre-Chamber Jet Ignition Powertrain Achieving High Load, High Efficiency and Near Zero NOx Emissions", JSAE 20119100, SAE International Jet Engines, SAE International, Society of Automotive Engineers of Japan, Inc., vol. 5, Issue 3, Aug. 2011 (13 pages).

Toulson, Elisa et al., "A Review of Pre-Chamber Initiated Jet Ignition Combustion Systems", SAE International, Oct. 2010 (26 pages).

Attard, William P. et al., "A Turbulent Jet Ignition Pre-Chamber Combustion System for Large Fuel Economy mprovements in a Modern Vehicle Powertrain", SAE International Jet Engines, SAE International, vol. 3, Issue 2, May 2010, pp. 20-37 (18 pages).

Alvarezz, Carlos Eduardo Castilla et al., "A review of prechamber ignition systems as lean combustion technology for SI engines", Applied Thermal Engineering, ScieneDirect, Elsevier Ltd., vol. 128, 2018, pp. 107-120 (14 pages).

Schumacher, Moritz et al., "Pre-chamber Ignition System for Homogenous Lean Combustion Processes with Active Fuelling by Volatile Fuel Components", Ignition Systems for Gasoline Engines: 4th International Conference, Dec. 2018, pp. 292-310 (19 pages).

Andres, Jan, "Scavenged Pre-chamber for a Light-Duty Truck Gas Engine", Diploma Thesis, Czech Technical University in Prague Faculty of Mechanical Engineering, 2016 (82 pages).

Kumar, R et al., "Reformers for the Production of Hydrogen from Methanol and Alternative Fuels for Fuel Cell Powered Vehicles", ANL-92/31, Argonne National Laboratory, Aug. 1992 (35 pages).

International Search Report and Written Opinion issued in Application No. PCT/US2020/055968, dated Apr. 8, 2021 (12 pages).

\* cited by examiner

METHOD AND SYSTEM FOR EXTENDING DILUTION LIMIT OF A PRECHAMBER SPARK IGNITION ENGINE

FIELD

The disclosure relates generally to spark ignition (SI) engines and more particularly to a method and system of extending an operating limit of a prechamber SI engine.

BACKGROUND

One opportunity for improving engine efficiency and reducing transport related emissions, such as $CO_2$ emissions and other pollutants, without significantly increasing transportation costs is a concept known as turbulent jet ignition (TJI). TJI uses a prechamber to combust a small quantity of fuel. As a result of the combustion, high energy flame jets are ejected from the prechamber into a main combustion chamber, where they ignite compressed fuel-air mixture in the main combustion chamber. The high energy flame jets provide distributed ignition sites that enable fast combustion and high burn rates of the fuel-air mixture in the main combustion chamber. TJI enables efficient combustion of very lean or dilute mixtures. However, TJI technology suffers from challenges with operation at low load and cold start and with emissions when operating lean. In particular, dilution tolerance with recycled inert exhaust gases is usually poor, and dilution with excess air is limited by ignitability of the gases in the prechamber. Furthermore, operation of the main combustion chamber under lean conditions generates nitrogen oxide (NO)) emissions, requiring expensive aftertreatment technology.

SUMMARY

In a first summary example, a system includes an engine having a main combustion chamber and a prechamber containing a spark plug. The prechamber is disposed at least partially within the main combustion chamber and is in communication with the main combustion chamber through at least one orifice. The system includes an engine intake line having an inlet end in communication with an ambient environment and an outlet end in communication with the engine. The engine intake line provides intake air to the engine. The system includes an engine exhaust line having an inlet end in communication with the engine and an outlet end in communication with the ambient environment. The engine exhaust line receives exhaust gases from the engine. The system includes an exhaust gas recirculation (EGR) line in communication with the engine intake line and the engine exhaust line. The EGR line selectively transports a portion of the exhaust gases from the engine exhaust line to the engine intake line and thereby forms an EGR loop through the engine. The system includes a reformer having a reactor containing a catalyst-coated substrate. The reformer generates a gaseous reformate from a fuel. The system includes a prechamber feed line in fluid communication with the reformer and the prechamber. The prechamber feed line transports a stream of the gaseous reformate from the reformer to the prechamber.

The prechamber feed line may include a mixing section in which a supply of air contacts the stream of the gaseous reformate. The prechamber feed line may be connected to an intake port of the prechamber. The system may include a valve disposed in the intake port to selectively permit flow from the prechamber feed line into the prechamber.

The system may include an exhaust feed line in fluid communication with the engine exhaust line and the reactor. The exhaust feed line transports a stream of the exhaust gases from the engine exhaust line to the reactor. The exhaust feed line may include a mixing section in which a supply of air contacts the stream of the exhaust gases.

The system may include an exhaust vent line in fluid communication with the engine exhaust line and a portion of an environment containing the reformer. The exhaust vent line may transport a stream of the exhaust gases from the engine exhaust line to the portion of the environment containing the reformer. The stream of the exhaust gases transported by the exhaust vent line may provide heating to the reformer.

The reformer may include a vaporizer in fluid communication with the reactor. The vaporizer may be arranged to receive the fuel and output a vaporized fuel to the reactor for generation of the gaseous reformate.

The system may include a valve disposed in the EGR line to control flow of the exhaust gases from the engine exhaust line to the engine intake line. The system may include a cooling device disposed in the EGR line and operable to move heat from the exhaust gases flowing through the EGR line into the engine intake line. The system may include a compressor disposed in the engine intake line and operable to compress flow in the engine intake line. The system may include a turbine disposed in the engine exhaust line and driven by the exhaust gases flowing through the engine intake line. The turbine may be operatively coupled to the compressor.

The system may include an exhaust emission control device. The reformer may be constructed concentrically inside the exhaust emission control device. Alternatively, the system may include a vaporizer that is constructed concentrically inside the exhaust emission control device and in communication with the reformer.

In a second summary example, a method for operating an engine includes generating a stream of hydrogen-rich gaseous reformate in a reformer located outside of an engine cylinder. The act of generating a stream of hydrogen-rich gaseous reformate in a reformer located outside of an engine cylinder includes contacting a fuel with a catalyst-coated substrate in a reactor of the reformer. The method includes, for each of a plurality of operating cycles of the engine, providing a first combustible mixture including a portion of the hydrogen-rich gaseous reformate in a prechamber of the engine; providing a second combustible mixture in a main combustion chamber of the engine; spark igniting the first combustible mixture in the prechamber to generate a plurality of flame jets; ejecting the plurality of flame jets from the prechamber into the main combustion chamber, whereby the flame jets ignite the second combustible mixture in the main combustion chamber; ejecting exhaust gases generated from igniting the second combustible mixture out of the main combustion chamber; and directing at least a portion of the exhaust gases ejected out of the main combustion chamber to the reformer.

The act of generating a stream of hydrogen-rich gaseous reformate in a reformer located outside of an engine cylinder may include generating a hydrogen-rich gaseous reformate comprising hydrogen and carbon monoxide.

The act of directing at least a portion of the exhaust gases to the reformer may include providing the at least a portion of the exhaust gases as a stream of exhaust gases and feeding the stream of exhaust gases into the reactor. The method may include injecting the fuel into the stream of exhaust gases that is fed into the reactor. The method may include injecting air into the stream of exhaust gases that is fed into the reactor. The method may include spraying the fuel directly onto the catalyst-coated substrate. The act of directing at least a portion of the exhaust gases to the reformer may include heating the reformer by contacting the reformer with the at least a portion of the exhaust gases.

The act of contacting a fuel with a catalyst-coated substrate in a reactor of the reformer may include providing gasoline or methanol as the fuel. The method may include vaporizing the fuel prior to contacting the fuel with the catalyst-coated substrate.

The method may include diluting the second combustible mixture for a subsequent operation cycle with at least one of air and a portion of the exhaust gases ejected out of the main combustion chamber in a previous operation cycle. The portion of the exhaust gases may be cooled prior to diluting the second combustion mixture with the portion of the exhaust gases. A dilution level of the second combustible mixture with at least one of the air and the portion of the exhaust gases may be up to 40% or 50%.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with internal combustion engine systems have not been shown or described in detail to avoid unnecessarily obscuring descriptions of the implementations and embodiments. For the sake of continuity, and in the interest of conciseness, same or similar reference characters may be used for same or similar objects in multiple figures.

Efficiency improvements in a spark ignition (SI) engine is realized through generation of $H_2$-rich gaseous reformate outside of the engine cylinders and use of the $H_2$-rich gaseous reformate in fueling a prechamber containing a spark plug, where the prechamber acts as a main ignition source for a main combustion chamber. For an engine operating under stoichiometric conditions, the prechamber fueled with $H_2$-rich gaseous reformate extends the dilution limit of the combustion with cooled exhaust gas recirculation (EGR). The $H_2$-rich gaseous reformate is generated through catalytic reforming. In a preferred example, the $H_2$-rich gaseous reformate contains $H_2$ and CO and may contain other diluents such as $N_2$. In a more preferred example, the $H_2$-rich gaseous reformate is pure syngas consisting of $H_2$ and CO. The prechamber fueled with $H_2$-rich gaseous reformate is capable of igniting combustible mixtures that have been significantly diluted with excess air or exhaust gases. Tests show combustion stability with dilution level in the engine of 40% EGR or greater for $H_2$-rich gaseous reformate containing $H_2$, CO, and $N_2$ while operating the engine under stoichiometric conditions. Dilution with exhaust gases reduces $NO_x$ emissions out of the engine and avoids the need for expensive aftertreatment systems.

Figure 1:
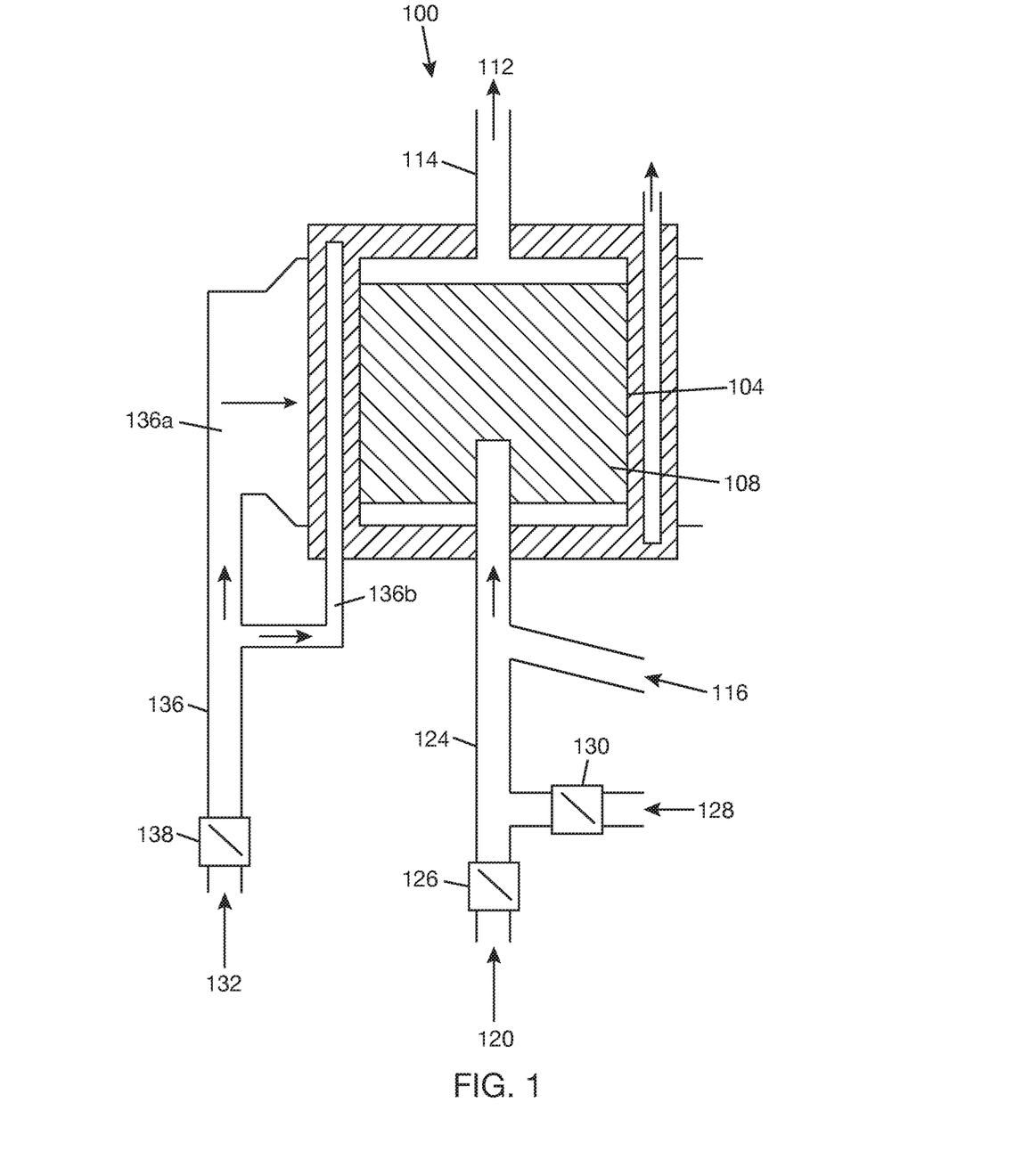
FIG. 1 is a schematic diagram of a reformer for generating a gaseous reformate onboard according to one illustrative implementation.

FIG. 1 shows one illustrative implementation of a reformer 100 that may used to generate a gaseous reformate during steady state operation of an engine, i.e., after engine startup. The term "reformate" refers to the product of the reformer. Reformer 100 includes a reactor 104 containing a catalyst-coated substrate 108. The substrate may be, for example, cordierite or other ceramic material. The catalyst coating may include one or more catalysts selected from platinum (Pt), palladium (Pd), rhodium (Rh), and other precious metal catalysts or platinum group metals. The selected catalyst(s) are carried by a washcoat, which may include one or more refractory inorganic materials, such as alumina, silica, and ceria. In one particular example, the catalyst coating contains Rh in an amount of approximately 1 percent by weight. In another particular example, the catalyst coating contains Rh and Pt, each in an amount ranging from approximately 0.01 to 5 percent by weight. For these examples, the remainder of the catalyst coating may be the materials of the washcoat.

Figure 2:
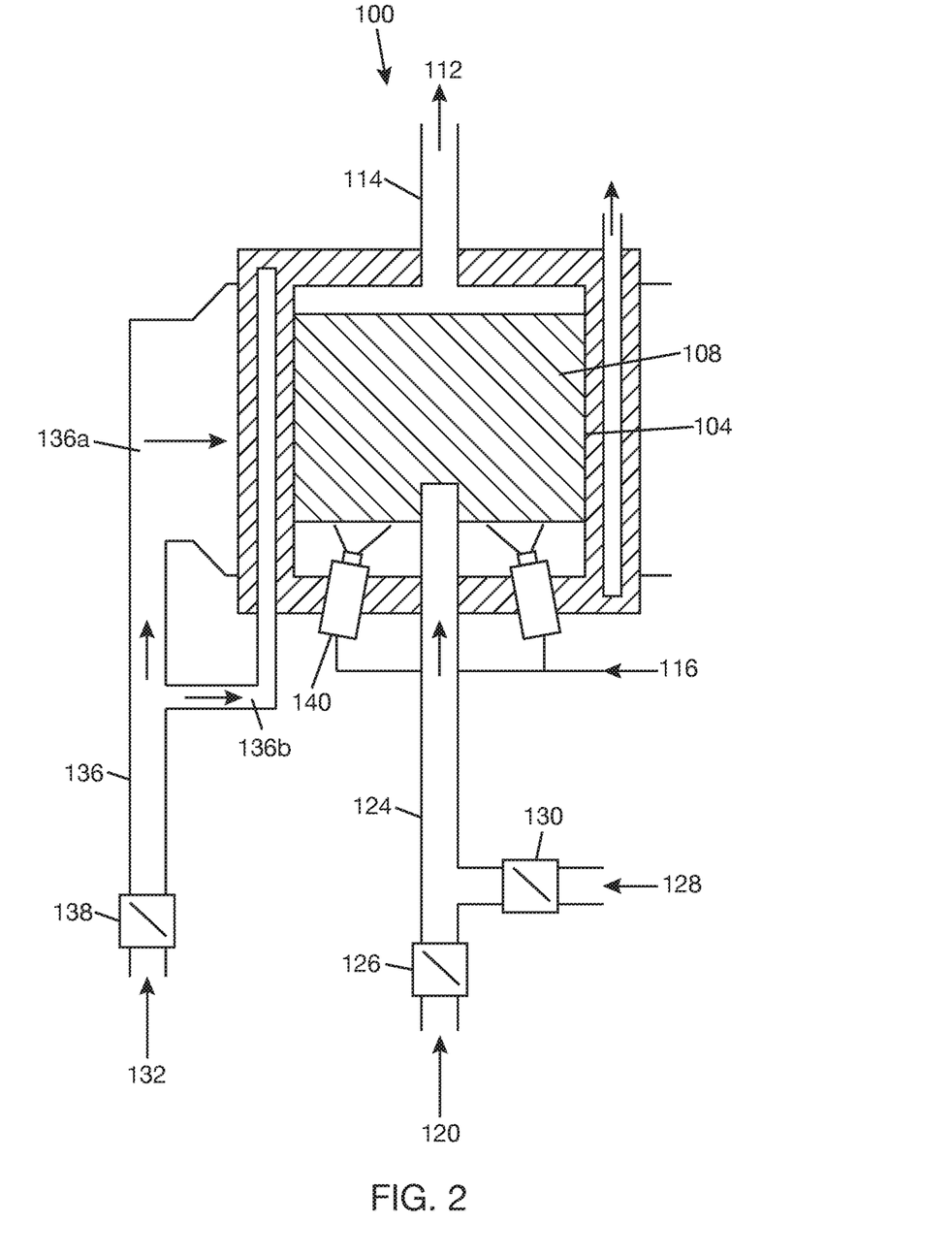
FIG. 2 is a modification of FIG. 1 showing nozzles arranged to spray fuel onto a catalyst-coated substrate in a reactor.

Reformer 100 outputs a stream of gaseous reformate 112 into an output line 114, which may be connected to a feed line of a prechamber (not shown). Reformer 100 converts a fuel 116 into gaseous reformate 112 in the presence of catalyst(s). The reforming process may include steam reforming or partial oxidation reforming or both steam reforming and partial oxidation reforming. In one implementation, exhaust gases 120 provide steam and/or $CO_2$ for reforming reactions. A stream of exhaust gases 120 is fed into reactor 104 through a feed line 124, which may be in communication with an exhaust line of an engine (not shown). An exhaust control valve 126 may mediate flow of exhaust gases from the exhaust line into feed line 124. Fuel 116 can be injected into a stream of exhaust gases 120 passing through feed line 124 into reactor 104. An alternative to injecting fuel 116 into the stream of exhaust gases 120 in feed line 124 is to spray fuel 116 directly onto catalyst-coated substrate 108. For illustrative purposes, FIG. 2 shows nozzles 140 arranged to spray fuel 116 onto catalyst-coated substrate 108. It is also possible to both spray fuel 116 onto catalyst-coated substrate 108 (as illustrated in FIG. 2) and inject fuel 116 into the stream of exhaust gases 120 in feed line 124 (as illustrated in FIG. 1). Air 128 may be optionally added to the stream of exhaust gases 120 in feed line 124, e.g., during startup of reformer 100. Air 128 can be heated by the stream of exhaust gases 120 and can enable fast warmup of reformer 100. A control valve 130 may be used to selectively permit addition of air 128 to the stream of exhaust gases 120 in feed line 124.

Referring to FIGS. 1 and 2, some reforming reactions inside reactor 104 may be endothermic reactions. To promote these reactions, heat may be applied to reformer 100 during the reforming process. In one implementation, a stream of exhaust gases 132 provides heat to reformer 100 through a vent line 136. The heating may be provided by bringing exhaust gases 132 into contact with surfaces of reformer 100. When reformer 100 is operatively coupled to an engine, vent line 136 can be fluidly connected to an exhaust line of the engine (not shown). This means that exhaust gases 132 for heating and exhaust gases 120 for reforming reactions can come from the same source. However, the stream of exhaust gases 132 will generally be on a different flow path compared to the stream of exhaust gases 120. Exhaust gases 132 may be fed in and around and in contact with surfaces of reformer 100 through branches 136a, 136b of vent line 136. Vent line branch 136b passing through reformer 100 may be isolated from reactor 104 so that exhaust gases 132 for heating do not mix with exhaust gases 120 fed into reactor 104 for reforming reactions. A control valve 138 may control flow of exhaust gases 132 into vent line 136.

In one implementation, fuel 116 is gasoline or a gasoline blend. If reformer 100 is operatively coupled to a gasoline engine, then reformer 100 and the engine can share the same supply of fuel. In the example where fuel 116 is gasoline, fuel 116 is partially converted into $H_2$ and CO inside reactor 104 via the following reactions:

$$C_xH_yO_z + \frac{x-z}{2}O_2 \rightarrow xCO + \frac{y}{2}H_2 \quad (1)$$

$$C_xH_yO_z + (x-z)H_2O \rightarrow xCO + \left(\frac{y}{2} + x - z\right)H_2 \quad (2)$$

$$C_xH_yO_z + (2x-z)H_2O \rightarrow xCO_2 + \left(\frac{y}{2} + 2x - z\right)H_2 \quad (3)$$

$$C_xH_yO_z + \left(x + \frac{y}{4} - \frac{z}{2}\right)O_2 \rightarrow xCO_2 + \frac{y}{2}H_2O \quad (4)$$

$$C_xH_yO_z + (x-z)CO_2 \rightarrow (2x-z)CO + \frac{y}{2}H_2 \quad (5)$$

$$CO + H_2O \leftrightarrow CO_2 + H_2 \quad (6)$$

Reactions (1), (4), and (6) are exothermic processes. Reactions (2), (3), and (5) are endothermic processes. In general, reactions (2) and (5) are preferred, and reactions (1) and (4) only occur if optional air is used in reactor 104 (either as excess air from combustion or auxiliary air supply). In an ideal case, all of the fuel and exhaust species flowing into reactor 104 are converted to $H_2$ and CO, resulting in $H_2$-rich gaseous reformate 112 with a composition of roughly 50% $N_2$, 25% $H_2$, and 25% CO. The exact composition of $H_2$-rich gaseous reformate 112 will depend on the composition of the gasoline used as fuel 116, the extent of conversion of the fuel, and the relative rates of various competing reactions. For real systems, some amount of $CH_4$, small (C2-C4) hydrocarbons, and unconverted gasoline fuel are expected. Table 1 shows an example gasoline composition fed to an engine and a gaseous reformate produced by feeding the same gasoline composition and exhaust gases from the engine to the reformer.

TABLE 1

| | Engine Inlet Composition (mol %) | Engine Exhaust Composition (mol %)[1] | Theoretical Optimal Reformer Inlet Composition (mol %)[1] | Theoretical Optimal Reformer Outlet Composition[1] | Measured reformate composition (mol %) |
|---|---|---|---|---|---|
| $O_2$ | 20.58 | 0.00 | 0.00 | 0.00 | 0.00 |
| $N_2$ | 77.43 | 73.68 | 70.93 | 47.88 | 48.78 |
| $CO_2$ | 0.00 | 13.26 | 12.76 | 0.00 | 0.87 |
| $H_2O$ | 0.00 | 13.06 | 12.57 | 0.00 | 1.32 |
| $H_2$ | 0.00 | 0.00 | 0.00 | 25.86 | 23.47 |
| CO | 0.00 | 0.00 | 0.00 | 26.26 | 22.46 |
| $CH_4$ | 0.00 | 0.00 | 0.00 | 0.00 | 0.29 |
| $C_2H_4$ | 0.00 | 0.00 | 0.00 | 0.00 | 0.04 |
| $C_3H_6$ | 0.00 | 0.00 | 0.00 | 0.00 | 0.03 |
| Gasoline | 1.99 | 0.00 | 3.73 | 0.00 | 0.302 |

[1]Calculated assuming gasoline with average carbon number of 7, H/C ratio of 1.97, and O/C ratio of 0.0305. For theoretical numbers, carbon is assumed to be converted to $CO_2$ in the engine and CO in the reformer. All hydrogen is assumed to be converted to $H_2O$ in the engine and $H_2$ in the reformer.

In general, reformer 100 may use exhaust gases only, exhaust gases and one or both of steam and air, air only, air and steam, or steam only to generate gaseous reformate from fuel. The efficiency and complexity of the reforming system will depend on the type of oxidant used and the sensible heat requirements (i.e., the heat required to warm the reactants, which is the difference between the inlet and outlet temperatures of the reformer). Steam reforming is preferred from a thermodynamic standpoint, but the temperature must be sufficiently high for conversion to occur. Water that may be converted to steam is present in exhaust gases. For example, a typical spark ignition exhaust contains approximately 12 to 13% mol water. Additional water for producing steam can be scavenged from exhaust as the exhaust travels to the tailpipe of the vehicle and cools down. Energy can be recovered via thermochemical recuperation of exhaust heat and used to heat air or water for the reformer. Endothermic steam reforming and dry reforming reactions, such as reactions (2), (3), and (5) convert exhaust heat into chemical potential energy.

Figure 3:
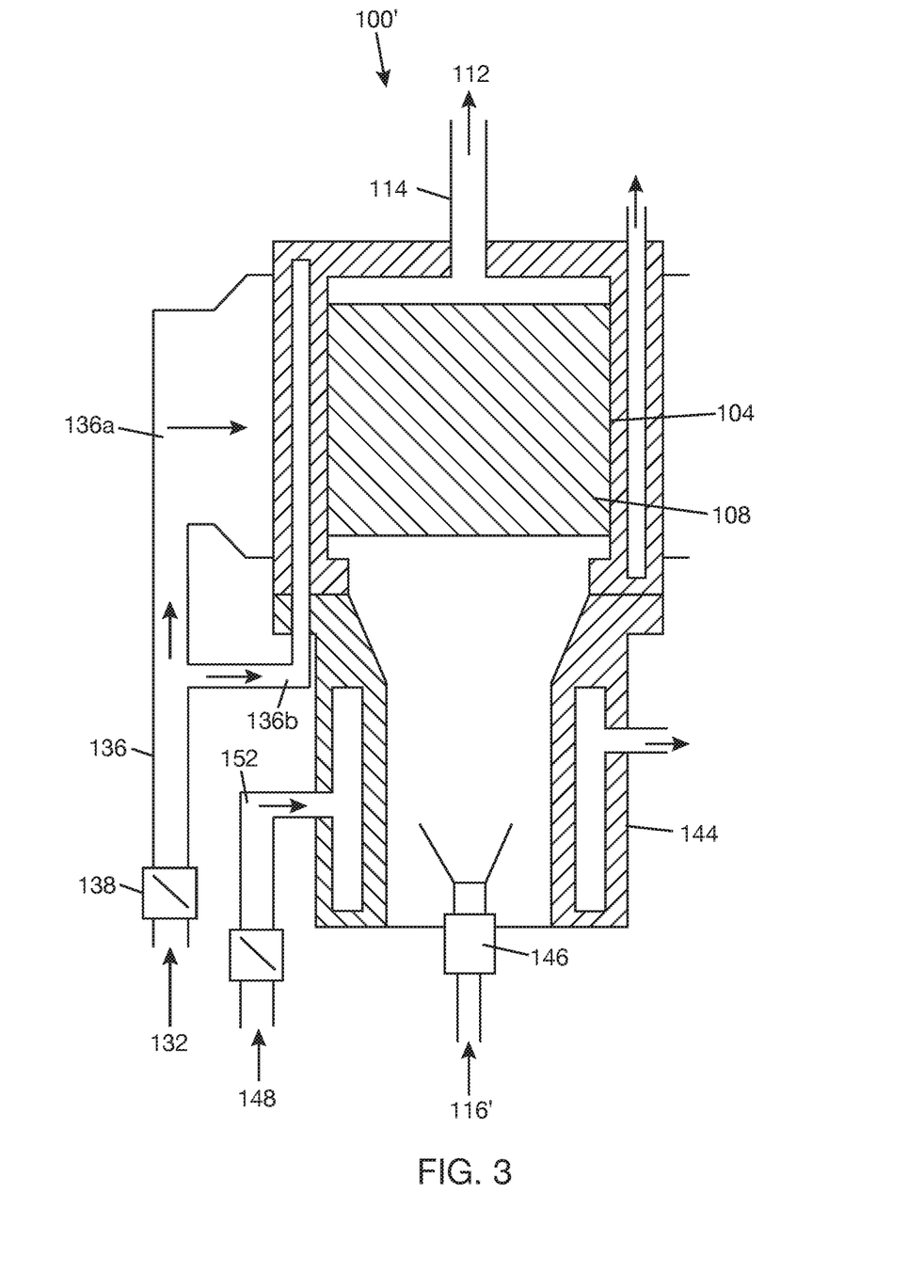
FIG. 3 is a schematic diagram of a reformer for generating a gaseous reformate onboard according to another illustrative implementation.

FIG. 3 shows a reformer 100' that is a modification of reformer 100. Reformer 100' includes a vaporizer 144 that is in communication with reactor 104. Fuel 116' is fed into vaporizer 144, e.g., through a nozzle 146. In one implementation, fuel 116' is an alcohol fuel or other alternative fuel carrying oxygen. Fuel 116' carrying its own oxygen does not require exhaust gases for reforming reactions. In one example, fuel 116' is methanol, which does not require an oxidant and can be reformed at low temperature. In one example, fuel 116' as methanol is vaporized in vaporizer 144 and then dissociated into $H_2$ and CO in reactor 104 as follows:

$$CH_3OH(l) \rightarrow CH_3OH(g) \quad (7)$$

$$CH_3OH(g) \rightarrow CO(g) + 2H_2(g) \quad (8)$$

The vaporization and dissociation of methanol are endothermic processes. Heating for the vaporization of methanol may be provided by exhaust gases 148 through feed line 152. Heating for the dissociation of methanol may be provided by exhaust gases 132 flowing through vent lines 136, 136a, 136b. If only vaporized methanol is fed to reactor 104, i.e., if exhaust gases are not fed into reactor 104, then reformer 100' will produce substantially pure syngas (67 mol % $H_2$ and 33 mol % CO) as gaseous reformate 112. This higher content of $H_2$ and CO in the gaseous reformate has advantages in terms of ignition energy in the prechamber. As shown in reaction (8), reforming reactions occur in the gas phase. Vaporizing methanol allows methanol to be in a phase where reforming reactions occur. However, it is possible to reform methanol using the previously described reformers (in FIGS. 1 and 2), i.e., methanol could be injected or sprayed into any combination of exhaust gases, air, and steam to enable reforming reactions in the reactor.

Figure 4:
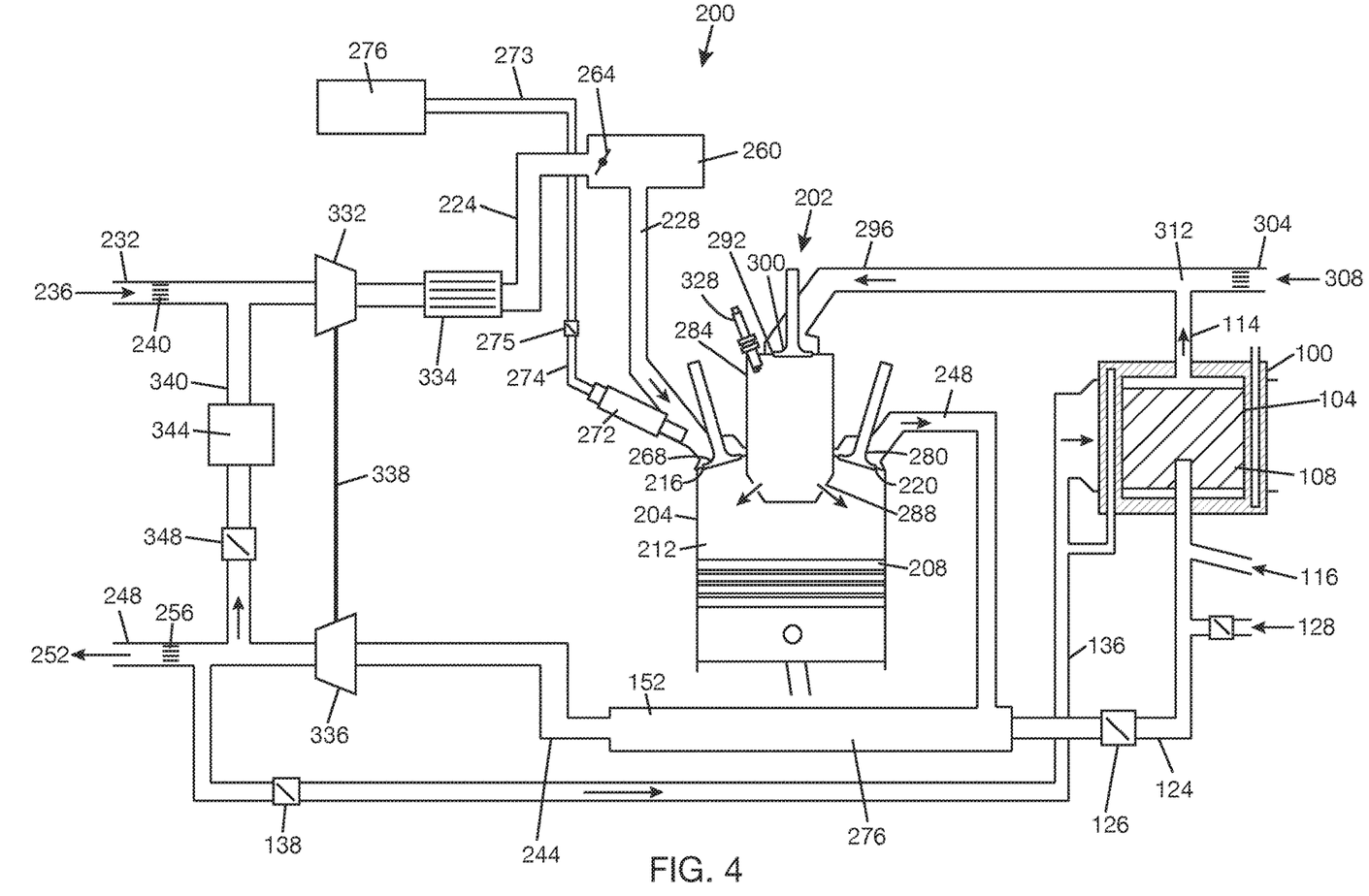
FIG. 4 is a schematic diagram showing the reformer of FIG. 1 operatively coupled to a spark ignition (SI) engine according to one illustrative implementation.

FIG. 4 shows a system 200 including reformer 100 and an engine 202. Engine 202 includes an engine cylinder 204 formed within an engine body or engine block (not shown separately). For ease of illustration, engine 202 is shown with a single cylinder 204. However, engine 202 is not limited to a single cylinder and may have multiple cylinders. A piston 208 is arranged to move back and forth inside cylinder 204. Piston 208 is connected to a crankshaft (not shown), which converts the reciprocating motion of piston 208 into rotary motion, as is well known in the art of reciprocating engines. Main combustion chamber 212 is defined within cylinder 204. The volume of main combustion chamber 212 depends on the position of piston 208 within cylinder 204. The head of cylinder 204 includes an intake port 216 and an exhaust port 220. Intake port 216 is in fluid communication with an intake line 224 through an inlet line 228. Intake line 224 has an inlet end 232 to receive air 236 from the ambient environment. Intake line 224 may include a particulate filter 240 to remove particulate material from the received air. Exhaust port 220 is in fluid communication with an exhaust line 244 through an outlet line 248. Exhaust line 244 has an outlet end 248 to discharge exhaust gases 252 to the ambient environment. Exhaust line 244 may include an exhaust emission control device 256 (e.g., a catalytic converter) to reduce toxic gases and pollutants in the exhaust gases discharged to the ambient environment.

Intake line 224 terminates in an intake manifold 260. Inlet line 228 is connected between intake port 216 and intake manifold 260. The flow of air from intake manifold 260 into inlet line 228 may be controlled by a throttle valve 264. An intake valve 268 is arranged at intake port 216 to control flow from inlet line 228 into main combustion chamber 212. In one example, a fuel injector 272 may be positioned to inject fuel into the air flowing into intake port 216 from inlet line 228. The flowing air entrains the fuel, delivering a fuel-air mixture to main combustion chamber 212. Alternatively, a fuel injector may be positioned to inject fuel directly into main combustion chamber 212, where the injected fuel will mix with air received in main combustion chamber 212 through intake port 216. Alternatively, both port injection and direct injection of fuel into main combustion chamber 212 may be used. Fuel injector 272 is connected to a fuel line 273 via an inlet line 274. Valve 275 may control flow of fuel to fuel injector 272. Fuel line 273 is connected to a fuel supply 276. The details of fuel supply 276 are not shown but are well known in the art. In general, fuel supply 276 includes a fuel tank and a fuel pump to transfer fuel from the fuel tank to fuel line 273. Exhaust line 244 begins at exhaust manifold 276. Outlet line 248 from exhaust port 220 is connected to exhaust manifold 276. An exhaust valve 280 is arranged at exhaust port 220 to control flow from main combustion chamber 212 into outlet line 248. Opening and closing of valves 268, 275, 280 may be controlled by a computer (not shown) according to an engine stroke cycle.

A prechamber 284 is formed within the engine body. Prechamber 284 is arranged at the head of cylinder 204 such that at least a portion of prechamber 284 is disposed inside main combustion chamber 212. The portion of prechamber 284 disposed inside main combustion chamber 212 includes one or more orifices 288 that allow fluid communication between prechamber 284 and main combustion chamber 212. An intake port 292 is formed in a wall of prechamber 284. Intake port 292 is connected to an inlet line 296, which is in fluid communication with outlet line 114 of reformer 100. An intake valve 300 may be arranged in intake port 292 to control flow of fluid from inlet line 296 into prechamber 284. In one implementation, inlet line 296 has an inlet end 304 to receive air 308 from the ambient environment. Inlet line 296 includes a section 312 where air 308 is mixed with a stream of gaseous reformate from outlet line 114 of reformer 100. Prechamber 284 receives the mixture of air and gaseous reformate through intake port 292 when intake valve 300 is open. In this example, the mixture of air and gaseous reformate form the scavenge gas for prechamber 284, i.e., the gas that displaces or dilutes any existing gas within the volume of prechamber 284. Prechamber 284 contains a spark plug 328, which delivers current to prechamber 284 to ignite the combustible mixture inside prechamber 284.

Figure 5:
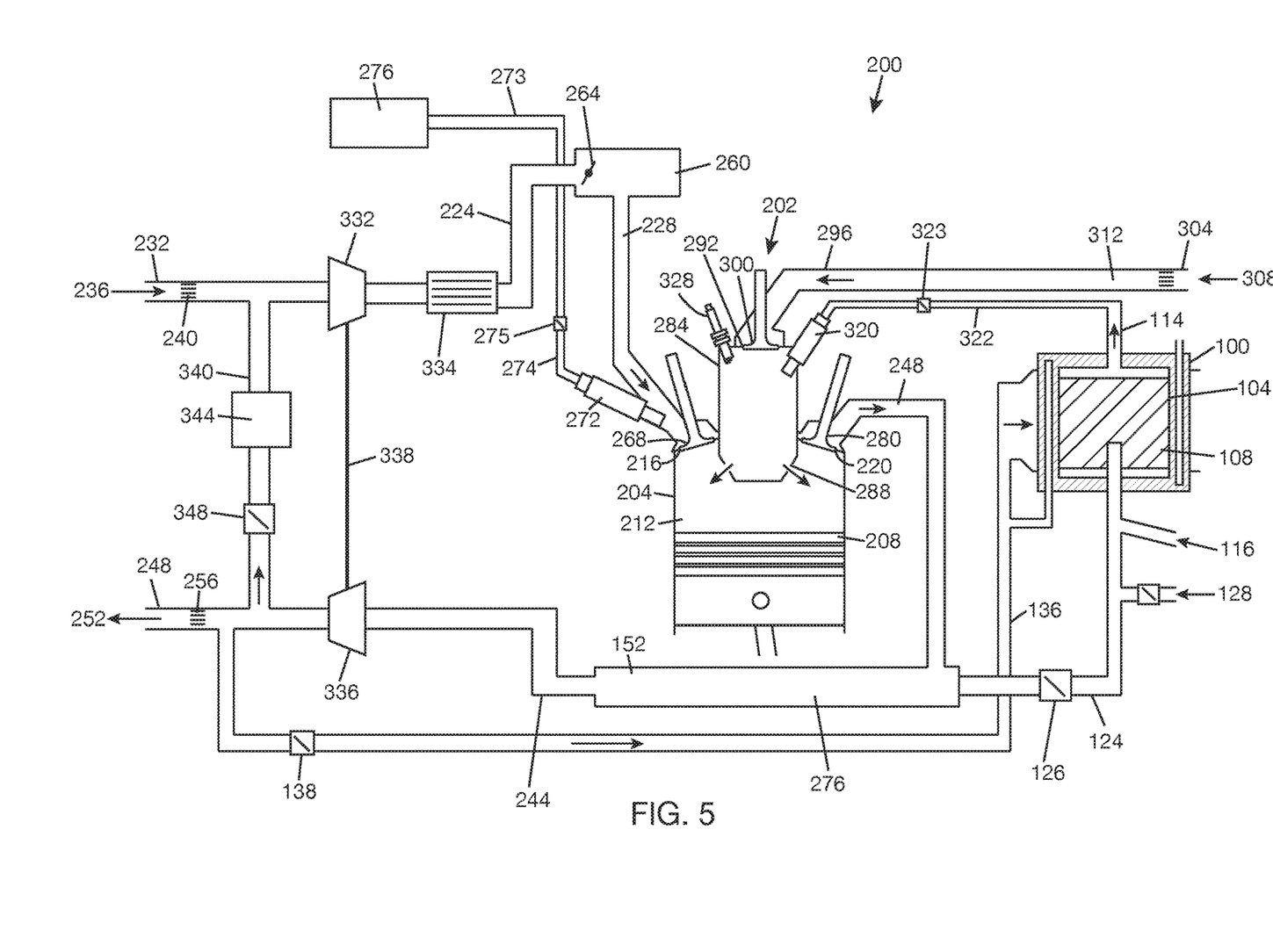
FIG. 5 is a modification of FIG. 4 showing independent feeding of a gaseous reformate and air into a prechamber.
Figure 6:
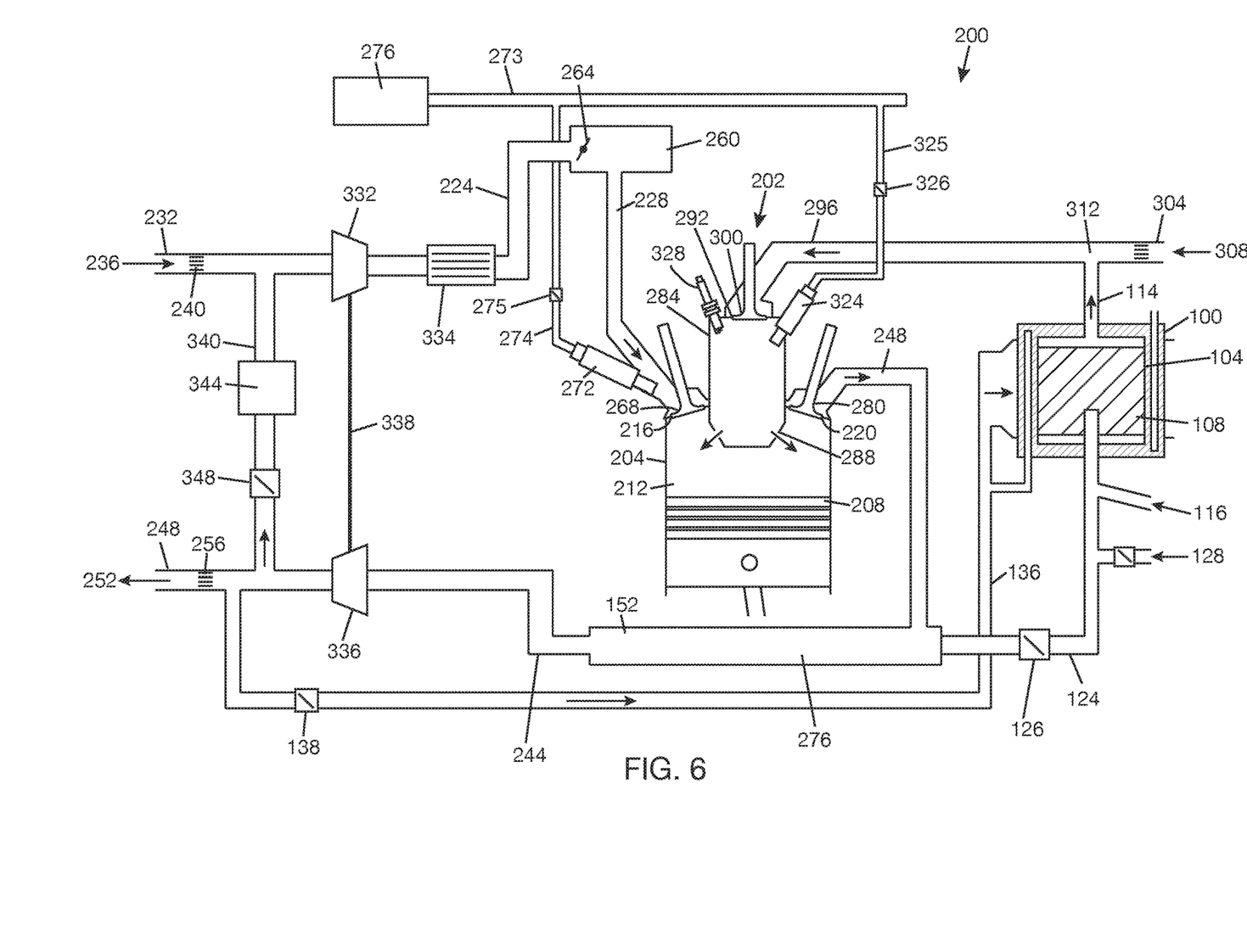
FIG. 6 is a modification of FIG. 4 showing feeding of a gaseous reformate, air, and a liquid fuel into a prechamber.

FIG. 5 shows an alternative implementation of feeding prechamber 284. In FIG. 5, a gas injector 320 is installed in prechamber 284. Outlet line 114 of reformer 110 is connected to gas injector 320 via an inlet line 322, and gas injector 320 is used to feed the gaseous reformate generated by reformer 100 into prechamber 284. Valve 323 may control flow of the gaseous reformate from inlet line 322 to gas injector 320. Inlet line 296 is used to provide air to intake port 292 when valve 300 is open. In this alternative implementation, air and gaseous reformate are fed separately into prechamber 284. FIG. 6 shows another implementation where a fuel injector 324 is installed in prechamber 284. Fuel injector 324 is connected to fuel line 273 via inlet line 325. Valve 326 may control flow of fuel from fuel line 273 to fuel injector 324. A mixture of air and gaseous reformate is fed into prechamber 284 through intake port 292. FIGS. 4-6 show that gaseous reformate may be fed into prechamber 284 either directly, via gas injector 320 (in FIG. 5), or indirectly, via first feeding the gaseous reformate into air and then feeding the mixture of air and gaseous reformate into prechamber 284 when valve 300 is open (in FIGS. 4 and 6) in order to scavenge prechamber 284. In the example where the gaseous reformate is added to prechamber 284 directly via gas injector 320, the gaseous reformate is used as the sole fuel. In the example were gaseous reformate premixed with air is added to prechamber 284 via intake port 292, gaseous reformate can be used as the sole fuel or as a supplemental fuel in prechamber 284.

Reformer 100 generates the gaseous reformate that is supplied to prechamber 284. In one implementation, a stream of exhaust gases from exhaust line 244 is fed into feed line 124 of reformer 100. In one example, fuel 116 is injected into the stream of exhaust gases passing through feed line 124 into reactor 104 of reformer 100. Alternatively, fuel 116 may be sprayed directly onto catalyst-coated substrate 108 (as shown in FIG. 2). Air 128 may be optionally injected into the stream of exhaust gases passing through feed line 124 into reactor 104. Fuel 116 contacts catalyst-coated substrate 108 inside reactor 104 and is converted into the gaseous reformate in the presence of catalyst(s) in the catalyst-coated substrate 108. Exhaust gases from feed line 124 provide steam and/or $CO_2$ for the reforming reactions. A stream of gaseous reformate exits reformer 100 through outlet line 114. Heat is provided to reformer 100 for reforming reactions through vent line 136, which is connected to exhaust line 244. The connection of vent line 136 may be before emissions control device 256. Valve 138 in vent line 136 may allow supply of exhaust gases to reformer 100 for heating purposes to be bypassed under certain conditions, e.g., during cold start of the engine. Exhaust that indirectly contacts the reformer then travels to the three-way catalyst in the emissions control device 256 and finally to the tailpipe. In an alternative implementation, which is not shown, the reformer may be located concentrically inside the three-way catalyst of the emissions control device, in which case, the exhaust is simultaneously providing heat to the reformer while passing through the three-way catalyst.

The air (or air mixture) delivered to intake manifold 260 may be supercharged to increase the maximum power that the engine can deliver. Supercharging involves compressing the air (or air mixture). In one example, a compressor 332 is disposed in intake line 224 to provide compressed air to intake manifold 260. A cooling device 334 may be disposed in intake line 224, downstream of compressor 332, to cool the compressed air that is delivered to intake manifold 260. Cooling device 334 may be a chiller or other suitable heat exchanger. Compressor 332 is driven by a turbine 336 that is disposed in exhaust line 244. Turbine 336 and compressor 332 are connected by a shaft 338. Turbine 336 is driven by exhaust gases in exhaust line 244. Turbine 336 and compressor 332 on single shaft 338 form a turbocharger. Other methods of supercharging besides turbocharging may be used.

Figure 7:
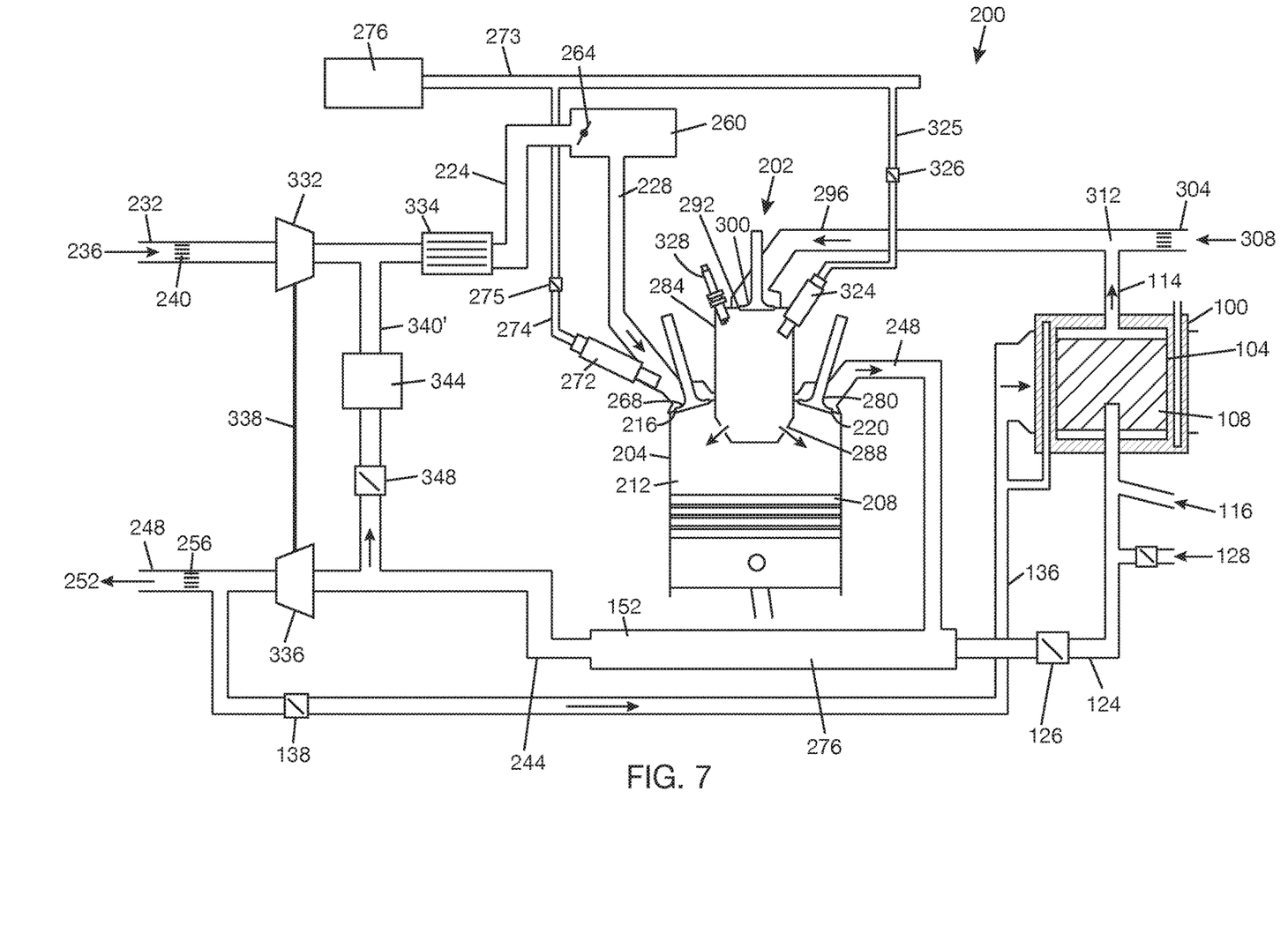
FIG. 7 is a modification of FIG. 6 showing a high pressure exhaust gas recirculation (EGR) loop.

An EGR line 340 is in fluid communication with intake line 224 and exhaust line 244. EGR line 340 allows exhaust gases to be transferred from exhaust line 244 to intake line 224. In one implementation, an inlet end of EGR line 340 connects to exhaust line 244 downstream of turbine 336, and an outlet end of EGR line 340 connects to intake line 224 upstream of compressor 332. In this case, exhaust gases from EGR line 340 is mixed with ambient air 236, and the compressor 332 compresses the mixture of ambient air and exhaust gases to produce the compressed air that is delivered to intake manifold 260. An EGR loop is formed that includes EGR line 340, the portion of intake line 224 running from EGR line 340 to engine 202, and the portion of exhaust line 244 running from engine 202 to EGR line 340. The EGR loop including EGR line 340 is a low pressure EGR loop. FIG. 7 illustrates a high pressure EGR loop including EGR line 340'. In this example, inlet end of EGR line 340' is connected to exhaust line 244 upstream of turbine 336, and outlet end of EGR line 340' is connected to intake line 224 downstream of compressor 332. In this case, exhaust gases mix with the compressed air (high pressure air) coming out of compressor 332. The high pressure EGR loop shown in FIG. 7 could be used with any of the prechamber feeding examples shown in FIGS. 4 and 5 and is not limited to the prechamber feeding example shown in FIG. 6. In FIGS. 4-7, an EGR cooling device 344 is disposed in EGR line 340 (340') to cool the exhaust gases delivered to intake line 224. A valve 348 may be disposed in EGR line 340 (340') to control flow of exhaust gases from exhaust line 244 into EGR line 340.

Figure 8:
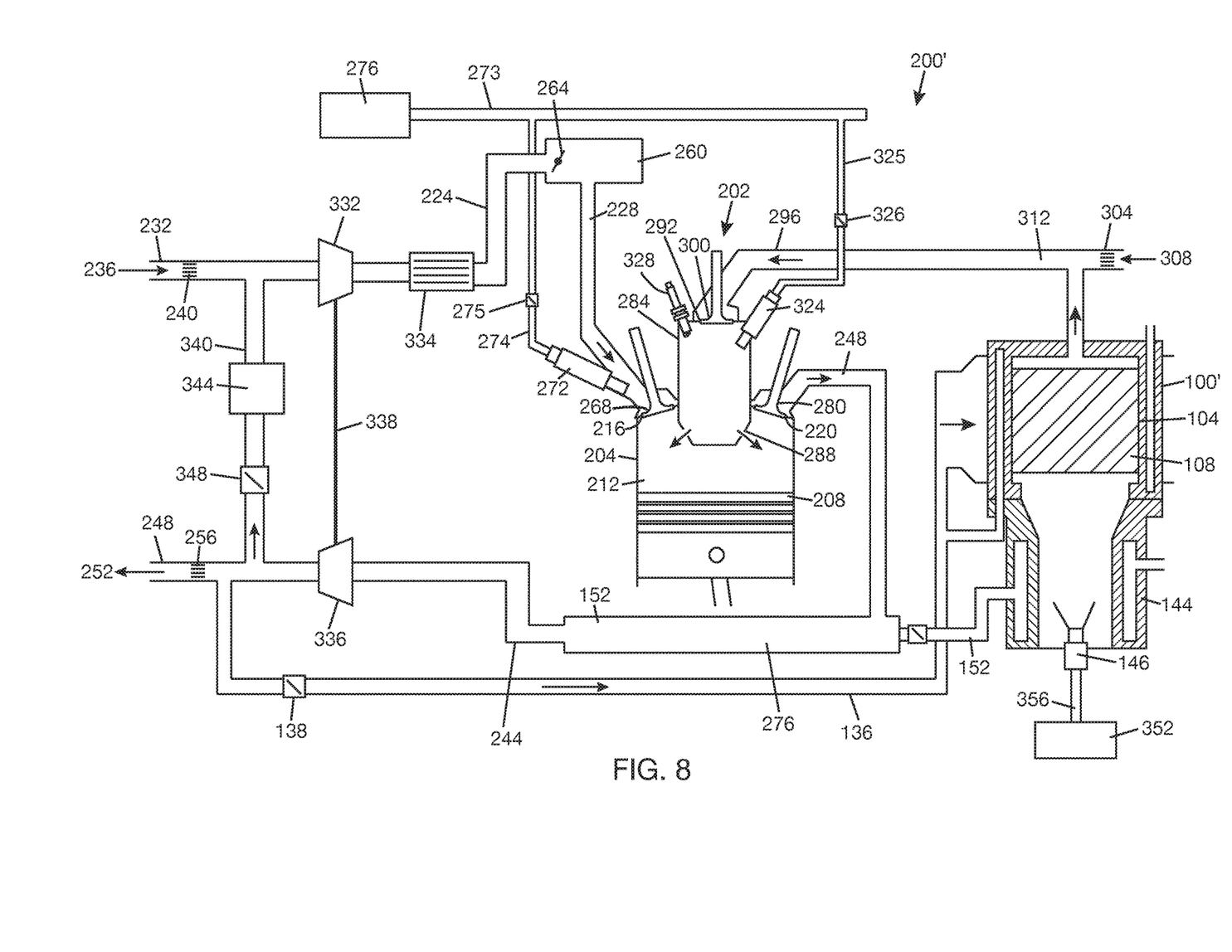
FIG. 8 is a schematic diagram showing the reformer of FIG. 3 operatively coupled to an SI engine according to another illustrative implementation.

FIG. 8 shows system 200' including alternative reformer 100' (in FIG. 3) and engine 202. The main difference between system 200' shown in FIG. 8 and system 200 shown in FIGS. 4-7 is in the routing of exhaust gases from exhaust line 244 to the reformer. In the system shown in FIG. 8, exhaust gases are not involved in the reforming reactions. Therefore, exhaust gases are not fed to reactor 104. Instead, a vent line 152 carries exhaust gases from exhaust line 244 to vaporizer 144 in order to provide heat to vaporizer 144. The exhaust gases carried to vaporizer 144 are isolated from the inside of vaporizer where vaporizing of a fuel is carried out. The fuel vaporized in vaporizer 144 and converted to a gaseous reformate in reactor 104 may be an alcohol fuel such as methanol or other fuel that carries oxygen. In this case, an auxiliary fuel supply 352 can provide the fuel to vaporizer 144, which then provides the vaporized fuel to reactor 104. The details of fuel supply 352 are not shown, but fuel supply 352 may generally include a fuel tank and a fuel pump to transfer fuel from the fuel tank to an inlet line 356 and nozzle 146. The system of FIG. 8 uses the prechamber feeding example shown in FIGS. 6 and 7. However, the prechamber feeding example shown in FIG. 4 or FIG. 5 could be used in other implementations of the system.

Referring to FIGS. 4-8, in one non-limiting example, cylinder 204 may operate on a four-stroke cycle including an intake stroke, a compression stroke, a power stroke, and an exhaust stroke. During the intake stroke, intake valve 268 is open, exhaust valve 280 is closed, and fuel and air are drawn into main combustion chamber 212. Intake valve 300 of prechamber 284 is also open, and gaseous reformate, air, and optionally a liquid fuel are fed into prechamber 284. The fuel-air mixture in prechamber 284 fully purges (or completely fills or scavenges) the prechamber volume. During compression stroke, valves 268, 300, 280 are closed, and the fuel-air mixture in main combustion chamber 212 is compressed by piston 208. This will push the fuel-air mixture in main combustion chamber 212 against orifices 288 of prechamber 284. At the end of compression stroke, the fuel-air mixture in prechamber 284 is ignited by spark plug 328, resulting in high temperature jets containing combustion products being ejected at high velocity from prechamber 284 into main combustion chamber 212. The high temperature jets rapidly burn the fuel-air mixture in main combustion chamber 212. During the power stroke, the high-pressure gases produced from combustion of the fuel-air mixture in main combustion chamber 212 expand and push piston 208 down, generating force on the crank and shaft and useful work. During the exhaust stroke, valve 280 is open, and piston 208 pushes exhaust gases out of main combustion chamber 212. The timing of opening and closing of valves 268, 280, 300 and operation of injectors 272, 320, 324 during the various strokes may be controlled by a computer (not shown).

Prechamber 284 that is fueled with gaseous reformate from reformer 100 (100') may provide various benefits. If the gaseous reformate includes $H_2$, the high flame speed of $H_2$ will allow combustion to proceed rapidly and easily when the spark plug is fired in prechamber. CO in the gaseous reformate also helps combustion in the prechamber. The gaseous reformate mixes readily with air and residual gases, providing a more homogeneous mixture for the prechamber, which translates to a more uniform distribution of ignition sites for the main chamber. If the prechamber is fueled only by a gaseous reformate, wetting of liquid on prechamber walls, spark plug, and other components is avoided. If the prechamber is fueled by a gaseous reformate and a liquid fuel, less of the liquid fuel will be required, leading to less wetting of prechamber walls, spark plug, and other components. The gaseous reformate can be generated onboard, which would allow continued use of existing liquid fuel infrastructure. The gaseous reformate, which is highly flammable, results in ejection of high energy flame jets into main combustion chamber 212 when prechamber 284 is ignited. These high energy flame jets readily ignite fuel-air mixture in main combustion chamber 212, even with fuel-air mixtures that have been significantly diluted with excess air or exhaust gases, e.g., dilution levels up to 40% or higher (or up to 50% or higher), which is well beyond what a typical spark plug is able to ignite.

By improving prechamber ignitability, dilution tolerance is improved. The greater dilution tolerance allows the fuel-air mixture in main combustion chamber 212 to be diluted with air or with exhaust gas. Although dilution with air is preferable for efficiency, dilution with exhaust gases reduces $NO_x$ emissions and avoids the need for expensive aftertreatment systems. Dilution with air can be achieved by simply opening the throttle valve (264 in FIGS. 4-8) to increase the intake air pressure or by operating a turbo or supercharger device at high load. Dilution with exhaust gases can be achieved via the EGR loop (340, 340' in FIGS. 4-8). At low engine load, exhaust gases can be provided through phasing of the intake and exhaust cams (the cams that control opening of the intake and exhaust valves) to allow exhaust gases to flow back into the intake or through an external EGR loop. In the case where exhaust gases are allowed to flow back into the intake, at low load, the intake port is at low pressure and the exhaust port is at high pressure. Thus, if both intake and exhaust valves are open (e.g., during the intake stroke), exhaust will flow from the exhaust port back into the intake port. Thus, the "fresh" charge is internally diluted with exhaust gas. At high engine load, only an external EGR loop can be used. Low pressure EGR, where EGR is fed after the turbine and before the compressor (as shown in FIGS. 4-6, 8) is preferred under high-load conditions. By improving prechamber ignitability and including scavenge air, lean limits are extended, reducing $NO_x$ emissions when air dilution is used in the main chamber. A further benefit of air or exhaust dilution is the reduction of knock propensity. Dilution reduces the peak end-gas temperature and pressure reducing propensity of the mixture to auto-ignite, which causes noise and engine damage. Less knock allows an increase in compression ratio and more optimal combustion phasing. Lower peak combustion temperatures reduce the need for enrichment at high load and reduce NOx emission. Thus, by improving prechamber ignitability and extending main-chamber dilution limits, knock propensity is also reduced, allowing further efficiency gains.

Five test fuels were prepared. The characteristics of each fuel are shown in Table 2. The test fuels were fed to a prechamber while operating the engine at 40% EGR, which is the percent of total intake mixture that is recycled exhaust. $N_2$ is a diluent in all the fuels shown in Table 2. With the exception of CO—$N_2$ fuel, all the different test fuels used an equivalence ratio of 0.92-0.93 in the main chamber. Equivalence ratio is the ratio of the actual fuel/air ratio to the stoichiometric fuel/air ratio. Combustion is stoichiometric if the equivalence ratio is 1, lean with excess air if the equivalence ratio is less than 1, and rich with incomplete combustion if the equivalence ratio is greater than 1. For CO—$N_2$, the equivalence ratio reduced below 0.92, but only because this was needed to improve combustion stability. Table 2 reports the coefficient of variation (COV) of indicated mean effective pressure (IMEP), which is a measure of combustion stability, for each test fuel. A lower value of COV in IMEP indicates greater dilution tolerance. As shown, $H_2$—CO—$N_2$ blend shows superior performance compared to the other test fuels. Pure syngas, which does not have $N_2$ diluent, is expected to have even better performance compared to $H_2$—CO—$N_2$ blend.

TABLE 2

| Gas Name | Gas Composition | EGR rate (%) | Equivalence Ratio | COV IMEP (%) |
|---|---|---|---|---|
| $H_2$—$N_2$ | 25% $H_2$ in $N_2$ | 40 | 0.922 | 1.1 |
| $H_2$—CO—$N_2$ | 25% $H_2$ and 25% CO in $N_2$ | 40 | 0.927 | 0.81 |
| $CH_4$—$N_2$ | 25% $CH_4$ in $N_2$ | 40 | 0.925 | 2.47 |
| CO—$N_2$ | 25% CO in $N_2$ | 40 | 0.847 | 1.09 |
| $C_3H_8$—$N_2$ | 25% $C_3H_8$ in $N_2$ | 40 | 0.924 | 1.36 |

Table 3 shows additional parameters identified for optimal performance of the prechamber for the test fuels identified in Table 2.

TABLE 3

| | Prechamber fuel flow (scc/cycle) | Air flow rate (SCFM) | Air valve open (bTDCF) | Air valve duration (CAD) | Air pressure (psi) | Prechamber Fuel SOI (bTDCF) |
|---|---|---|---|---|---|---|
| $H_2$-$N_2$ | 2.41 | 0.393 | 160 | 30 | 30 | 95 |
| $H_2$-CO-$N_2$ | 2.40 | 0.386 | 160 | 30 | 30 | 120 |
| $CH_4$-$N_2$ | 2.28 | 0.56 | 160 | 30 | 45 | 95 |
| CO-$N_2$ | 2.18 | 0.185 | 170 | 30 | 15 | 115 |
| $C_3H_8$-$N_2$ | 0.73 | 0.67 | 160 | 30 | 45 | 95 | scc = standard cubic centimeter

SCFM = standard cubic feet per minute bTDCF = before top dead center (firing)

CAD = crank angle degree

While the invention has been described with respect to a limited number of embodiments, those skilled in the art, having the benefit of this disclosure, will appreciate that other embodiments can be devised that do not depart from the scope of the invention as described herein. Accordingly, the scope of the invention should be limited only by the accompanying claims.

What is claimed is:

1. A system, comprising:
    an engine comprising:
        a main combustion chamber; and
        a prechamber containing a spark plug, the prechamber disposed at least partially within the main combustion chamber and in fluid communication with the main combustion chamber through at least one orifice;
    an engine intake line having an inlet end in communication with an ambient environment and an outlet end in communication with the engine, the engine intake line to provide intake air to the engine;
    an engine exhaust line having an inlet end in communication with the engine and an outlet end in communication with the ambient environment, the engine exhaust line to receive exhaust gases from the engine;
    an exhaust gas recirculation line in communication with the engine intake line and the engine exhaust line, the exhaust gas recirculation line to selectively transport a portion of the exhaust gases from the engine exhaust line to the engine intake line and thereby form an exhaust gas recirculation loop through the engine;
    a reformer comprising a reactor containing a catalyst-coated substrate, the reformer to generate a gaseous reformate from a fuel;
    a prechamber feed line in fluid communication with the reformer and the prechamber, the prechamber feed line to transport a stream of the gaseous reformate from the reformer to the prechamber; and
    an exhaust feed line in fluid communication with the engine exhaust line and the reactor, the exhaust feed line to transport a stream of the exhaust gases from the engine exhaust line to the reactor,
    wherein the exhaust feed line includes a mixing section in which the fuel contacts the stream of the exhaust gases; and
    wherein the exhaust feed line includes the mixing section in which a supply of air contacts the stream of the exhaust gases.

2. The system of claim 1, wherein the prechamber feed line includes the mixing section in which a supply of air contacts the stream of the gaseous reformate.

3. The system of claim 2, wherein the prechamber feed line is connected to an intake port of the prechamber, and further comprising a valve disposed in the intake port to selectively permit flow from the prechamber feed line into the prechamber.

4. The system of claim 1, further comprising an exhaust vent line in fluid communication with the engine exhaust line and a portion of an environment containing the reformer, the exhaust vent line to transport the stream of the exhaust gases from the engine exhaust line to the portion of the environment containing the reformer, the stream of the exhaust gases transported by the exhaust vent line to provide heating to the reformer.

5. The system of claim 1, wherein the reformer further comprises a vaporizer in fluid communication with the reactor, the vaporizer arranged to receive the fuel and output a vaporized fuel to the reactor for generation of the gaseous reformate.

6. The system of claim 1, further comprising a valve disposed in the exhaust gas recirculation line to control flow of the exhaust gases from the engine exhaust line to the engine intake line.

7. The system of claim 6, further comprising a cooling device disposed in the exhaust gas recirculation line and operable to remove heat from the exhaust gases flowing from the exhaust gas recirculation line into the engine intake line.

8. The system of claim 7, further comprising:
    a compressor disposed in the engine intake line and operable to compress flow in the engine intake line; and
    a turbine disposed in the engine exhaust line and driven by the exhaust gases flowing through the engine intake line, the turbine operatively coupled to the compressor.

9. A method for operating an engine, comprising:
    generating a stream of hydrogen-rich gaseous reformate in a reformer located outside of an engine cylinder, the generating comprising contacting a fuel with a catalyst-coated substrate in a reactor of the reformer;
    for each of a plurality of operating cycles of the engine,
        providing a first combustible mixture comprising a portion of the hydrogen-rich gaseous reformate in a prechamber of the engine;
        providing a second combustible mixture in a main combustion chamber of the engine;
        spark igniting the first combustible mixture in the prechamber to generate a plurality of flame jets;
        ejecting the plurality of flame jets from the prechamber into the main combustion chamber, whereby the flame jets ignite the second combustible mixture in the main combustion chamber;
        ejecting exhaust gases generated from igniting the second combustible mixture out of the main combustion chamber;
        directing at least a portion of the exhaust gases ejected out of the main combustion chamber to the reformer; and
        diluting the second combustible mixture for a subsequent operation cycle with at least one of air and a portion of the exhaust gases ejected out of the main combustion chamber in a previous operation cycle.

10. The method of claim 9, wherein generating a stream of hydrogen-rich gaseous reformate in a reformer located outside of an engine cylinder comprises generating hydrogen-rich gaseous reformate comprising hydrogen and carbon monoxide.

11. The method of claim 9, wherein directing the at least a portion of the exhaust gases to the reformer comprises providing the at least a portion of the exhaust gases as a stream of exhaust gases and feeding the stream of exhaust gases into the reactor.

12. The method of claim 11, further comprising at least one of injecting the fuel into the stream of exhaust gases that is fed into the reactor and injecting air into the stream of exhaust gases that is fed into the reactor.

13. The method of claim 11, wherein directing the at least a portion of the exhaust gases to the reformer comprises heating the reformer by contacting the reformer with the at least a portion of the exhaust gases.

14. The method of claim 9, wherein contacting a fuel with a catalyst-coated substrate in a reactor of the reformer comprises providing gasoline or methanol as the fuel.

15. The method of claim 14, further comprising vaporizing the fuel prior to contacting the fuel with the catalyst-coated substrate.

16. The method of claim 9, further comprising cooling the portion of the exhaust gases prior to diluting the second combustion mixture with the portion of the exhaust gases, wherein a dilution level of the second combustible mixture with at least one of the air and the portion of the exhaust gases is up to 50%.

17. A method for operating an engine, comprising:
generating a stream of hydrogen-rich gaseous reformate in a reformer located outside of an engine cylinder, the generating comprising contacting a fuel with a catalyst-coated substrate in a reactor of the reformer;
for each of a plurality of operating cycles of the engine,
providing a first combustible mixture comprising a portion of the hydrogen-rich gaseous reformate in a prechamber of the engine;
providing a second combustible mixture in a main combustion chamber of the engine;
spark igniting the first combustible mixture in the prechamber to generate a plurality of flame jets;
ejecting the plurality of flame jets from the prechamber into the main combustion chamber, whereby the flame jets ignite the second combustible mixture in the main combustion chamber;
ejecting exhaust gases generated from igniting the second combustible mixture out of the main combustion chamber; and
directing at least a portion of the exhaust gases ejected out of the main combustion chamber to the reformer;
diluting the second combustible mixture for a subsequent operation cycle with at least one of air and a portion of the exhaust gases ejected out of the main combustion chamber in a previous operation cycle; and
cooling the portion of the exhaust gases prior to diluting the second combustion mixture with the portion of the exhaust gases, wherein a dilution level of the second combustible mixture with at least one of the air and the portion of the exhaust gases is up to 50%.

\* \* \* \* \*